May 24, 1927.

T. TUCHEK 1,629,851

POTATO ELEVATOR AND WEED CARRIER

Filed April 1, 1924

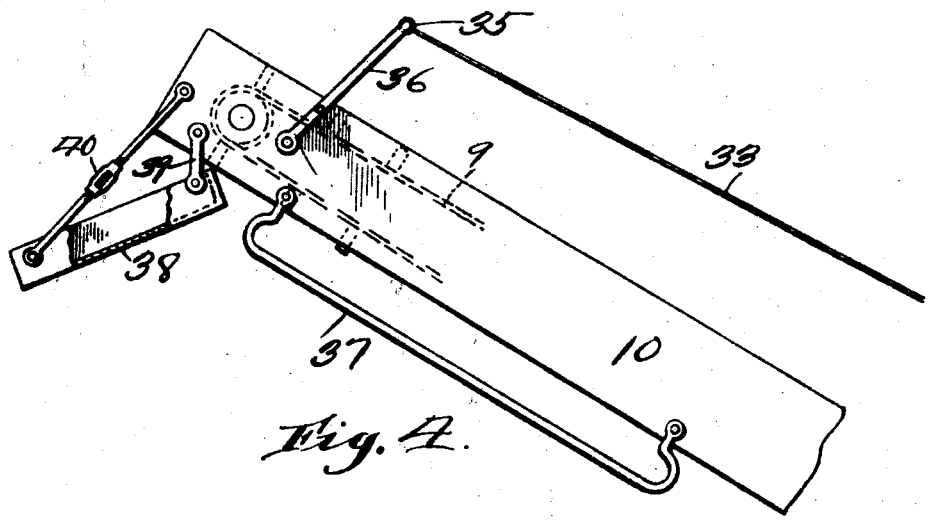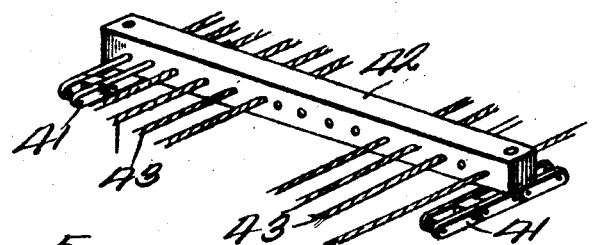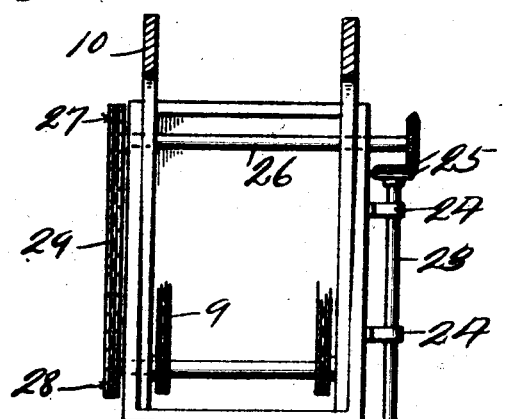

Patented May 24, 1927.

1,629,851

UNITED STATES PATENT OFFICE.

THOMAS TUCHEK, OF HEMINGFORD, NEBRASKA.

POTATO ELEVATOR AND WEED CARRIER.

Application filed April 1, 1924. Serial No. 703,543.

The invention relates to potato elevators and weed carriers used in connection with potato digging machines, and has for its object to provide a transversely disposed upwardly inclined potato conveyor, beneath a rearwardly extending weed and clod conveyor and onto which transversely disposed conveyor potatoes drop and are conveyed and discharged into a wagon adjacent the potato digger.

A further object is to form the endless belt of the potato conveyor from endless ropes through which ropes dirt will drop and will not be delivered into the wagon.

A further object is to provide a pivoted deflecting tray supported at the outer end of the transversely disposed conveyor and into which tray potatoes are discharged from the conveyor and thence into the wagon.

A further object is to support the conveyor as a whole from a stay anchored to a stay post on the potato digger.

A further object is to provide the under side of the transversely disposed potato conveyor adjacent its outer end with guide members adapted to engage the side of a wagon body for preventing damage thereto.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 3 is an enlarged side elevation of the outer end of the transversely disposed conveyor.

Figure 4 is a detail perspective view of a portion of the potato elevating conveyor.

Figure 5 is a top plan view of the transversely disposed conveyor operating mechanism.

Figure 1:
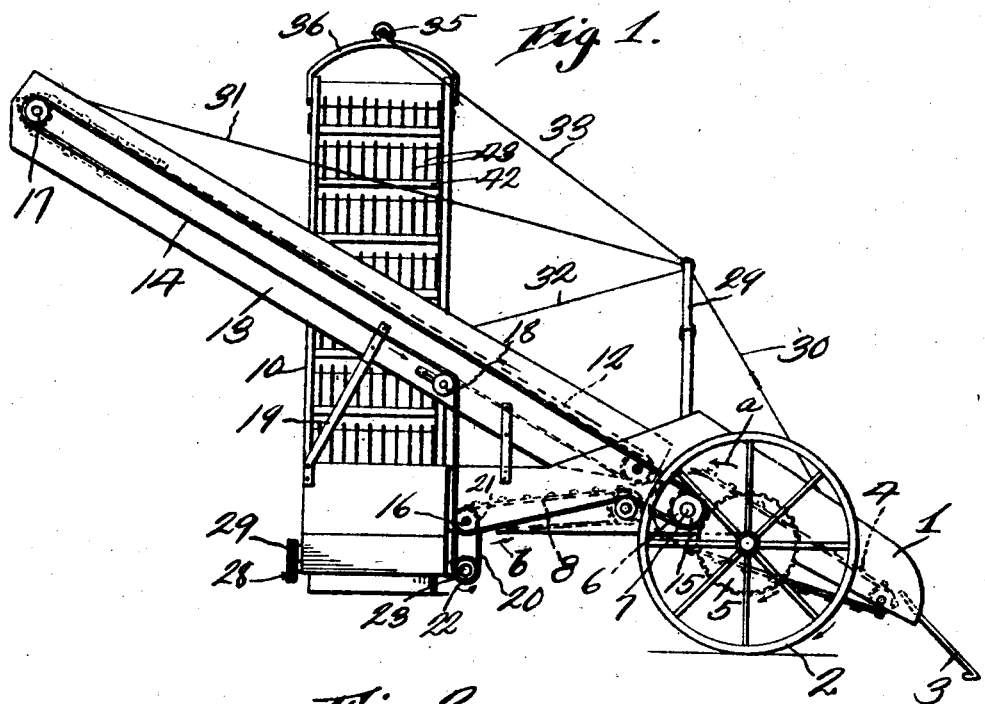
Figure 1 is a side elevation of the potato digging machine.
Figure 2:
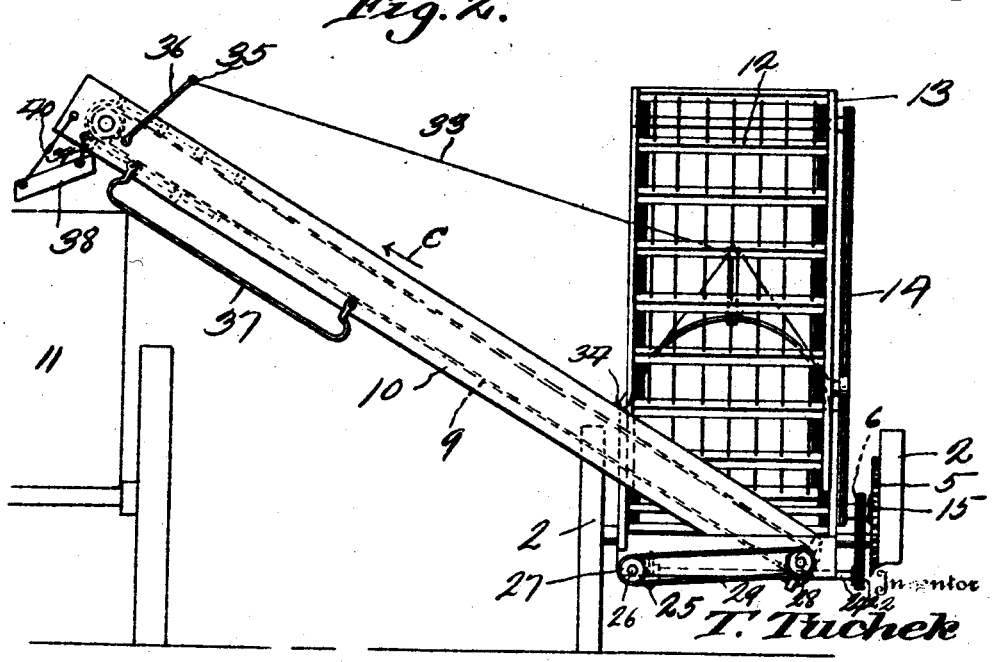
Figure 2 is a rear elevation of the machine.

Referring to the drawings, the numeral 1 designates the main body of a potato digger, which body is supported on ground engaging wheels 2. The forward end of the body 1 is provided with digging elements 3 adapted to plow through the ground and cause potatoes to be deposited on the potato conveyor 4, which moves in the direction of the arrow $a$. The conveyor 4 is operated by means of a gear 5 carried by the wheel 2, and which gear meshes with a gear 6 carried by the shaft 7 adjacent the free end of the body 1 of the potato digger. The potatoes elevated by the conveyor 4 are deposited on the rearwardly extending conveyor 8, which moves in the direction of the arrow $b$, and which conveyor deposits potatoes on the transversely and upwardly extending endless conveyor 9 carried by the conveyor frame 10, and which transversely disposed conveyor 9 elevates the potatoes and discharges them into the wagon 11 at one side of the potato digger. As a whole, therefore the digging and loading of the potatoes is a continuous operation. The vines which are dug and elevated are discharged onto the upwardly and rearwardly extending conveyor 12 in the conveyor frame 13, and are discharged at the rear end thereof onto the ground, consequently the vines are not discharged into the wagon 11 with the potatoes. The conveyors 8 and 12 are operated by the endless sprocket chain 14, which chain extends over the drive sprocket 15 and sprockets 16 and 17, and also over the idle pulley 18, consequently it will be seen that the ground engaging wheels 2 will operate all of said conveyors as the potato digger advances during a digging operation. The conveyor 9 which elevates the pototoes has its frame 10 at its lower end supported and attached to the conveyor frame 13 by means of the brace 19, and the endless conveyor 9 is driven by means of a sprocket chain 20, which extends around sprockets 21 and 22 carried by the sprocket 16 and the shaft 23 which is rotatably mounted in bearings 24 carried by the inner side of the frame 13 adjacent its lower end. The inner end of the shaft 23 has bevelled gear connections 25 with a longitudinally disposed shaft 26, the rear end of which is provided with a sprocket 27 and around which sprocket and the conveyor drive sprocket 28, a sprocket chain 29 extends, consequently during the forward movement of the machine as a whole, the endless conveyor 9 will be moved in the direction of the arrow $c$ for elevating potatoes deposited thereon by the conveyor 8.

Disposed on the main body 1 of the potato digging machine is a mast 29, which mast is braced by a stay 30. Extending from the mast 29 to the rear end of the conveyor frame 13 is a stay 31, which braces and supports the conveyor frame 13 at all times. The transversely disposed conveyor frame 10 is braced and supported by means of the stays 32 and 33, one of which is anchored at 34 to the frame 10, and the other one connected at 35 to a U-shaped bracket 36 carried by the outer end of the conveyor 10, therefore it will be seen that the various conveyor frames are supported from a single mast 29, and the outer end of the conveyor frame 10 positively supported above a wagon 11 in a position where its brackets 37 carried by the under side of the conveyor frame 10 will rest on the side of the wagon, and consequently prevent banging against the wagon, or damage to the wagon as the potato digger moves forwardly during a potato digging operation. Suspended below the outer end of the conveyor frame 10 is a deflecting apron 38, into which potatoes are discharged from the conveyor 9, and deflected into the wagon body. The apron 38 has link connections 39 with the conveyor frame 10 at its inner end, and adjustable link connections 40 at its outer end, whereby the angle of the deflecting apron 38 may be varied.

The conveyor 10 is preferably formed from endless sprocket chains 41 having secured thereto transversely disposed bars 42, and through which bars endless ropes 43 extend, therefore it will be seen that the conveyor is cheaply constructed, and by providing the cables, the potatoes will be vibrated during their upward movement, and dirt which may be carried thereby, will be shaken therefrom and dropped to the ground.

From the above it will be seen that a potato elevating conveyor is provided in combination with a potato digging machine whereby potatoes after being separated from the vines will be conveyed upwardly transversely and discharged into a wagon at one side of the potato digger, thereby obviating gathering potatoes after a digging operation, or allowing accumulation of the potatoes in a receptacle on the potato digger. It will be seen that an adjustable deflecting apron is provided at the outer end of the elevating conveyor for deflecting the potatoes into the wagon, and means is provided on said conveyor for engaging the side of the wagon body and preventing damage thereto. The cable braces 32 and 33 allow the entire weight of the conveyor frame 10 to be supported on the wagon body at times when the wagon is going over uneven ground, thereby preventing banging of the conveyor on the wagon body.

The invention having been set forth what is claimed as new and useful is:—

1. A potato digging machine comprising a potato conveyor, an upwardly and rearwardly extending weed and vine conveyor in the plane of the potato conveyor, a rearwardly and downwardly inclined potato conveyor below the vine conveyor and potato conveyor, and onto which potatoes are deposited from the first mentioned potato conveyor, a transversely disposed and upwardly extending potato conveyor onto which the second mentioned potato conveyor discharges, said transversely disposed conveyor forming means whereby potatoes will be discharged to one side of the digging machine as a whole.

2. A potato digging machine comprising a frame, a downwardly and forwardly inclined endless belt potato conveyor carried by said frame, a weed conveyor extending rearwardly and upwardly from the rear end of the potato conveyor and in the plane of the potato conveyor, a second potato conveyor extending rearwardly and downwardly from the rear end of the first mentioned potato conveyor and disposed below the weed conveyor, all of said conveyors having one of their ends disposed adjacent each other.

In testimony whereof I have signed my name to this specification.

THOMAS TUCHEK.